(12) United States Patent
Rigney et al.

(10) Patent No.: US 7,667,919 B1
(45) Date of Patent: Feb. 23, 2010

(54) SYSTEMS AND METHODS FOR IDENTIFYING PUSHPIN RESONANCE MODE FOR A SERVO TRACK WRITER

(75) Inventors: Brian Rigney, Louisville, CO (US);
Konrad Kummli, Berthoud, CO (US);
Dave McMurtrey, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 722 days.

(21) Appl. No.: 11/542,687

(22) Filed: Oct. 2, 2006

Related U.S. Application Data

(60) Provisional application No. 60/722,828, filed on Sep. 30, 2005.

(51) Int. Cl.
*G11B 21/02* (2006.01)
(52) U.S. Cl. ...................................... 360/75
(58) Field of Classification Search .............. 360/75, 360/77.02, 77.04, 73.03, 51, 265.6
See application file for complete search history.

(56) References Cited

U.S. PATENT DOCUMENTS

| | | | |
|---|---|---|---|
| 6,304,406 B1 * | 10/2001 | Douglas et al. | 360/73.03 |
| 6,556,387 B1 * | 4/2003 | Misso et al. | 360/265.6 |
| 6,654,198 B2 * | 11/2003 | Liu et al. | 360/77.04 |
| 6,707,632 B1 * | 3/2004 | Raphael et al. | 360/75 |
| 6,785,084 B2 * | 8/2004 | Szita | 360/77.04 |
| 6,819,517 B2 * | 11/2004 | Fioravanti et al. | 360/75 |
| 6,867,949 B1 * | 3/2005 | Guo et al. | 360/265.6 |
| 6,882,494 B2 * | 4/2005 | Morioka | 360/75 |
| 6,882,497 B2 * | 4/2005 | Min et al. | 360/77.04 |
| 7,161,754 B2 * | 1/2007 | Hanazawa et al. | 360/51 |
| 7,203,018 B1 * | 4/2007 | Kummli et al. | 360/75 |
| 7,221,532 B1 * | 5/2007 | Shukla | 360/75 |

* cited by examiner

*Primary Examiner*—Fred Tzeng
(74) *Attorney, Agent, or Firm*—David K. Lucente

(57) ABSTRACT

A system for generating resonance mode information associated with a servo track writer system comprising a drive VCM, a drive arm assembly, an external VCM, an external arm assembly, and a mechanical connection between the external arm assembly and the drive arm assembly. The system of the present invention comprises a controller, a position sensor, and a processor. The controller is adapted to apply an injection signal to the drive VCM such that the injection signal causes movement of the external arm assembly through the drive arm assembly and the pushpin. The position sensor is configured to generate an output signal indicative of a position of the external arm assembly. The processor generates the resonance mode information based on the injection signal and the output signal.

49 Claims, 9 Drawing Sheets

(a) TIME DOMAIN (b) FREQUENCY DOMAIN

SYSTEMS AND METHODS FOR IDENTIFYING PUSHPIN RESONANCE MODE FOR A SERVO TRACK WRITER

RELATED APPLICATIONS

Priority is claimed from U.S. Provisional Patent Application Ser. No. 60/722,828 filed on Sep. 30, 2005, which is incorporated by reference in its entirety.

FIELD OF THE INVENTION

The present invention relates to hard disk drives and, more particularly, to servo track writing systems and methods for writing servo track information onto the disk.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional hard disk drive (HDD) system, generally designated 10, is illustrated in FIG. 1. The HDD system 10 comprises a data storage disk 12 that is rotated by a spin motor 14. The spin motor 14 is mounted to a base plate 16.

The HDD system 10 also includes a drive arm assembly 18, which includes a transducer 20 mounted to a flexure arm 22. As is conventional, the transducer 20 comprises both a write head and a read head. The drive arm assembly 18 is attached to an actuator arm 24 that can rotate about a bearing assembly 26. A drive voice coil motor (VCM) 28 cooperates with the actuator arm 24 and, hence, the drive arm assembly 18, to move the transducer 20 relative to the disk 12.

The spin motor 14, voice coil motor 28 and transducer 20 are coupled to a number of electronic circuits 30. As will be described in further detail below, the electronic circuits 30 typically include a read channel chip, a microprocessor-based controller, a random access memory (RAM) device, and associated signal drive and logic circuitry.

The disk drive system 10 typically includes a plurality of disks 12 and, therefore, a plurality of corresponding actuator arm assemblies 18. However, it is also possible for the disk drive system 10 to include a single disk 12 as shown in FIG. 1. Typically, one drive arm assembly 18 is provided for each surface of each disk 12. If multiple actuator arm assemblies 18 are used, each actuator arm assemblies 18 may be moved separately or two or more actuator arm assemblies 18 may be moved together.

FIG. 2 is a functional block diagram which illustrates a conventional disk drive such as that depicted at 10 in FIG. 1. The example hard disk drive system 10 is coupled to a host device 32 via an input/output port 34. In addition to the components of the disk drive system 10 shown and labeled in FIG. 1, FIG. 2 illustrates (in block diagram form) that the electronic circuits comprise a drive controller 36, a read/write channel 38, and an interface 40. The details of construction and operation of the host device 32, input/output port 34, and/or interface 40 are or may be conventional and will not be described herein in further detail.

The disk drive system 10 is used by the host device 32 as a data storage device. The host device 32 is typically a general purpose computing device but may be any device requiring the storage of data, such as a media playback device, telephone, camera, camcorder, or the like. The host device 32 delivers data access requests to the disk drive system 10 via the input/output port 34. The port 34 is used to transfer data between the disk drive system 10 and the host device 32 during read and write operations.

The drive arm assembly 18 is a semi-rigid member that acts as a support structure for the transducer 20, holding it above the surface of the disk 12. The drive arm assembly 18 is coupled at one end to the transducer 20 and at another end to the drive VCM 28. The drive VCM 28 is operative for imparting controlled motion to the actuator arm 18 to appropriately position the transducer 20 with respect to the disk 12. The drive VCM 28 operates in response to a control signal generated by the drive controller 36. The drive controller 36 generates the control signal in response to, among other things, an access command received from the host device 32 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the drive controller 36. The channel 38 is also generally capable of recovering timing information from the analog read signal.

During a write operation, the read/write channel 38 converts data received from the host device 32 into a write current signal that is delivered to the transducer 20 to "write" the data to an appropriate portion of the disk 12. The read/write channel 38 is also operative for continually processing data read from servo information stored on the disk 12 and delivering the processed data to the drive controller 36 for use in, for example, transducer positioning.

Referring now more specifically to the hard disk 12, as depicted in FIG. 2 data is stored on the disk 12 in substantially concentric data storage tracks 42 on its surface. The example data storage disk 12 also includes servo information in the form of a plurality of radially-aligned servo spokes 44 that each cross all of the tracks 42 on the disk 12. The portions of the track between the servo spokes 44 have traditionally been used to store data received from, for example, the host device 32 and are thus referred to herein as data regions 46.

In a magnetic disk drive system 10, data is stored, for example, in the form of magnetic polarity transitions within each track 42. Data is "read" from the disk 12 by positioning the transducer 20 (i.e., the read head) above a desired track 42 of the disk 12 and sensing the magnetic polarity transitions stored within the track 42 as the disk 12 moves below the transducer 20. Similarly, data is "written" to the disk 12 by positioning the transducer 20 (i.e., the write head) above a desired track 42 and delivering a write current representative of the desired data to the transducer 20 at an appropriate time.

The data storage tracks 42 are illustrated as center lines on the surface of the disk 12; however, it should be understood that the actual tracks will each occupy a finite width about a corresponding centerline. It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

The servo information in the servo spokes 44 is a specialized form of data stored on the disk 12 that is read by the transducer 20 during disk drive operation for use in positioning the transducer 20 above a desired track 42 of the disk 12. In particular, the disk drive system 10 operates in at least two positioning modes: seek and track following. During the seek mode, the system 10 moves the transducer 20 from an initial track 42a to a target track 42b. During the track following mode, the system 10 maintains the transducer 20 above the desired track 42 while data is read from or written to the disk 12.

The servo information is configured to allow the system 10 to operate in both the seek and track following modes. In particular, the servo information stored in the servo spokes allows the system 10 to determine a position of the transducer 20 relative to the disk 12. As is well-known in the to art, this position information is used during seek and track following modes by a servo compensator embodied by the drive controller 36.

Referring back for a moment to FIG. 2, it can be seen that the read/write channel comprises a preamplifier circuit 50 and a channel circuit 52. The preamplifier circuit 50 performs two functions. First, the preamplifier circuit 50 generates a write signal for driving the write head portion of the transducer 20 based on an analog differential drive signal generated by the channel circuit 52. Second, the preamplifier 50 generates an analog playback signal based on a read signal generated by the read head portion of the transducer 20. The playback signal is delivered to the channel circuit 52. The channel circuit 52 also performs two basic functions. First, the channel circuit 52 generates the analog differential drive signal based on the digital data to be written to the disk 12. Second, the channel circuit 52 converts the analog playback signal into digital data that can be processed by the drive controller 36 and/or host device 32. The details of construction and operation of the channel circuit 52 are or may be conventional and will not be described herein in further detail.

When the HDD system 10 is initially manufactured, the disk 12 is not formatted. Until the disk 12 is formatted with conventional or spiral servo track information, the drive controller 36 cannot determine the position of the transducer 20 relative to the disk 12. The transducer 20 thus cannot be used to read and write information of any kind, including servo information, to the disk 12 upon initial manufacture of the HDD system 10.

Referring now to FIG. 3 of the drawing, depicted therein is a servo track writer system 60 that is used to write servo track information onto the HDD system 10 immediately after initial manufacture of the system 10. The servo track information allows the disk 12 to be formatted for reading and writing using the drive controller 36.

The example servo track writer (STW) system 60 comprises, in addition to components the HDD system 10, an external controller 62, an external VCM 64, an external arm assembly 66, and a position sensor 68. To form the STW system 60, the disk 12 is mounted in a predetermined spatial relationship with the external VCM 64 and external arm assembly 66. The external arm assembly 66 is then mechanically coupled to the drive arm assembly 18. Under control of a servo compensator embodied by the external controller 62, the external VCM 64 moves the external arm assembly 66, and thus the drive arm assembly 18, to allow servo track information to be written to the disk 12.

After the servo track information has been written to the disk 12, the HDD system 10 is removed from the STW system 60. At that point, the disk 12 contains sufficient servo track information to allow the formatting process may be completed, if necessary, using the drive controller 36.

Ideally, the mechanical coupling between the external arm assembly 66 and the drive arm assembly 18 is absolutely rigid. In practice, however, it is not possible to ensure an absolutely rigid mechanical connection between the drive arm assembly 18 and the external arm assembly 66.

In particular, the mechanical connection between the arm assemblies 18 and 66 is formed by a pushpin 70 that extends from the external arm assembly 66 and a pushpin hole 72 (also shown in FIG. 1) formed in the flexure arm 22 of the drive arm assembly 18. Typically, a pushpin sleeve 74 extends at least partly around an engaging end 76 of the pushpin 70. To form the mechanical connection between the external arm assembly 66 and the drive arm assembly 18, the pushpin 70 is displaced, typically through an opening in the housing (not shown) of the HDD system 10, such that the pushpin 70 enters the pushpin hole 72. As shown in FIG. 3, the pushpin sleeve 74 lies between the engaging end 76 of the pushpin 70 and the surface of the flexure arm 22 defining the pushpin hole 72.

With the pushpin 70 in engagement with the drive arm assembly 18, a dominant mechanical pushpin resonance of the system formed by the HDD system 10 and the STW system 60 may appear that is not present in the external VCM dynamics alone. Pushpin resonance plays a major role in the quality of conventional or spiral servo track writing and can be highly influenced by the mechanical pushpin design and pushpin material. If the pushpin resonance occurs at an undesirable frequency or if it is lightly damped, the STW system may oscillate and the resonance frequency may be written into the servo pattern.

The need thus exists for systems and methods for detecting and/or compensating for push pin resonance to modify STW systems and thereby improve the pattern of the servo track information written onto the hard disks by servo track writer systems.

SUMMARY OF THE INVENTION

The present invention may be embodied as a system for generating resonance mode information associated with a servo track writer system comprising a drive VCM, a drive arm assembly, an external VCM, an external arm assembly, and a mechanical connection between the external arm assembly and the drive arm assembly. The system of the present invention comprises a controller, a position sensor, and a processor. The controller is adapted to apply an injection signal to the drive VCM such that the injection signal causes movement of the external arm assembly through the drive arm assembly and the pushpin. The position sensor is configured to generate an output signal indicative of a position of the external arm assembly. The processor generates the resonance mode information based on the injection signal and the output signal.

The present invention may also be embodied as a method for generating resonance mode information associated with a servo track writer system comprising a drive VCM, a drive arm assembly, and an external arm assembly, an external VCM, and a pushpin mechanically connecting the external arm assembly and the drive arm assembly. Such a method may comprise the following steps. An injection signal is applied to the drive VCM such that the injection signal causes movement of the external arm assembly through the drive arm assembly and the pushpin. An output signal indicative of a position of the external arm assembly is generated. The resonance mode information is generated based on the injection signal and the output signal.

DETAILED DESCRIPTION

Figure 1:
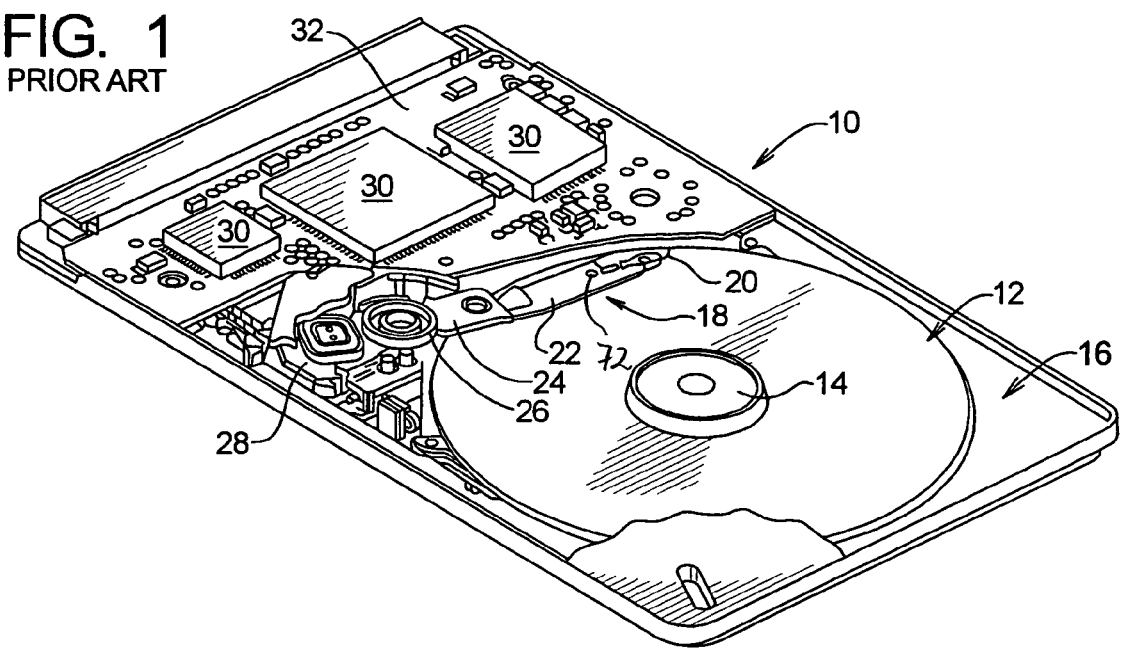
FIG. 1 is a perspective view of an example hard disk drive system.
Figure 2:
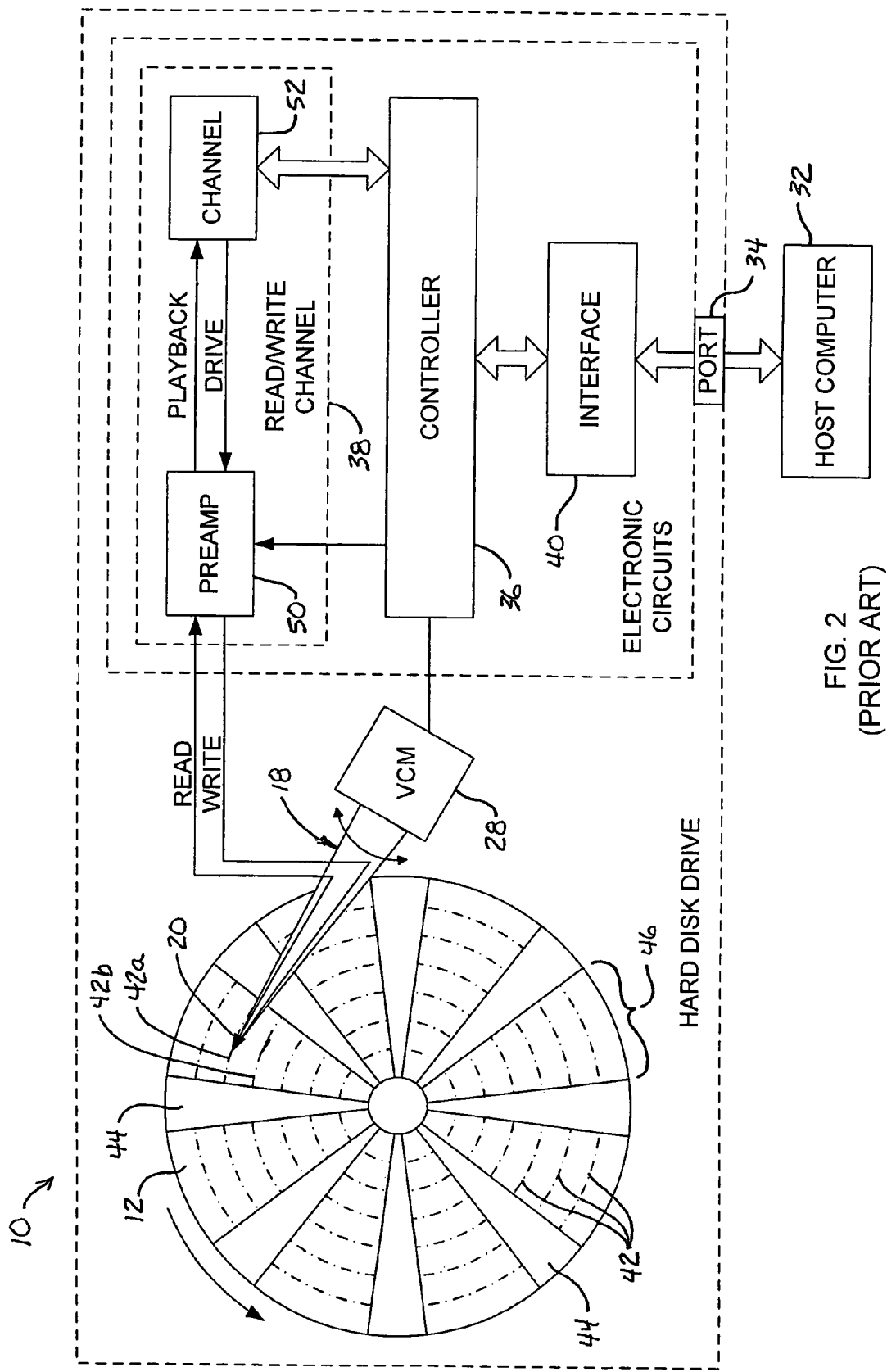
FIG. 2 is a simplified block diagram of an example hard disk drive system as depicted in FIG. 1.
Figure 3:
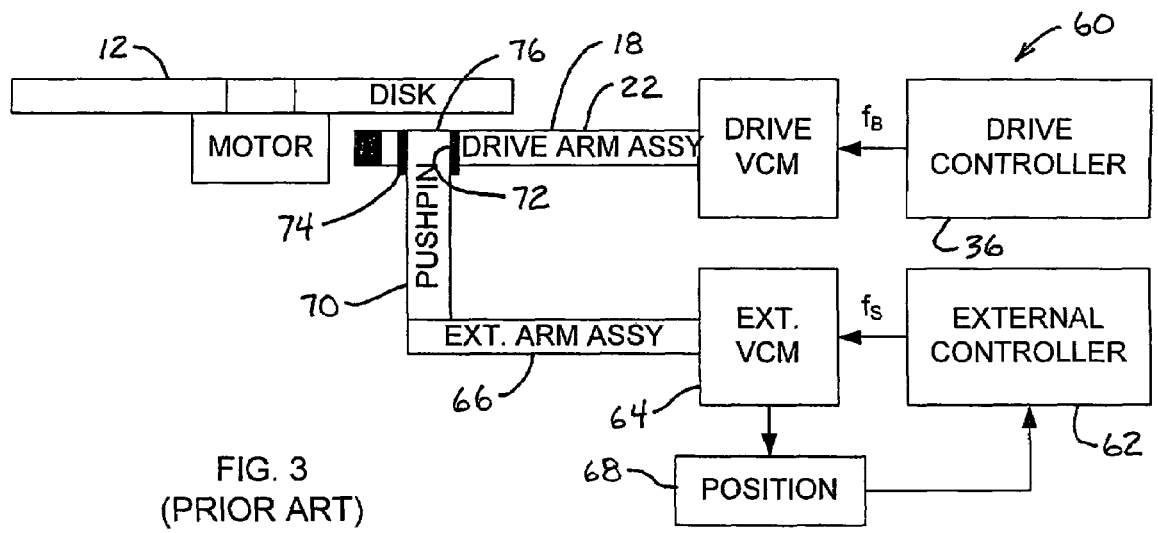
FIG. 3 is simplified block diagram of a conventional servo track writer system.

The present invention relates to systems and methods for generating resonance mode information associated with a pushpin and/or pushpin sleeve of a servo track writer system. Resonance mode parametric model information includes, as examples, the resonance mode damping ratio and frequency of the system transfer function and will also be referred to herein as resonance mode information. The resonance mode information can be used in a number of ways to improve the performance of servo track writer systems.

As one example, the resonance mode information associated with a particular STW servo system may be used to evaluate new pushpin designs. By changing the pushpin material or mechanical design, the resonance mode shifts in frequency and damping. The principles of the present invention may be used to generate resonance mode information for combinations of materials and mechanical designs to qualify new designs for use in STW systems.

As another example, the resonance mode information can be implemented in the form of an automated test for use in the production environment to identify failing pushpins, pushpin sleeves, and/or combinations thereof. Based on the resonance mode information, a servo track writer system can determine whether a particular pushpin, pushpin sleeve, and/or combination needs replacement. In particular, if the damping properties of the pushpin, pushpin sleeve, and/or combination thereof is diminished or if the resonance mode has shifted out of a desirable range, the pushpin, the pushpin sleeve, or both may be replaced. The principles of the present invention may thus also be used to generate resonance mode information for a particular STW system to determine whether replacement of the pushpin and/or pushpin sleeve is required.

As yet another example, the servo compensator of a servo track writer system may be adjusted based on the resonance mode information to accommodate a particular servo track writer system. Every servo track writer system will have a unique resonance frequency and damping ratio. The resonance mode information associated with a particular servo track writer system may be used to adapt the servo compensator of that particular servo track writer system to the unique resonance frequency and damping ratio thereof. The principles of the present invention may thus also be used to generate resonance mode information that is used as part of the servo compensator design for a particular STW system.

As another example, the methods of generating resonance mode information of the present invention may be implemented in an on-line, recursive system. In particular, the servo compensator of the servo track writer system may be adapted continuously in real-time, periodically, and/or asynchronously under certain conditions or events to provide improved STW system performance. Such improved performance would be especially useful if the resonance mode shifts over time. In this fourth example, the principles of the present invention may also be used to generate resonance mode information that is used to adapt the servo compensator design for the resonance frequency and damping ratio of a particular STW system as those characteristics change over time.

The following discussion will initially describe an analytical model illustrating the dynamics of a typical STW system. Following that will be an explanation of an example injection signal that may be used as part of a method of generating resonance mode information in accordance with the principles of the present invention. The next section describes one example technique for determining resonance mode frequency and damping ratio based on the transfer function of the STW system given the use of the example injection signal as the input to the drive VCM. The next section describes experimental results that validate the theoretical results obtained from analyzing the analytical model. After that, a number of example STW systems incorporating resonance mode information collected according to the principles of the present invention will be described.

I. Analytical Model

Figure 4:
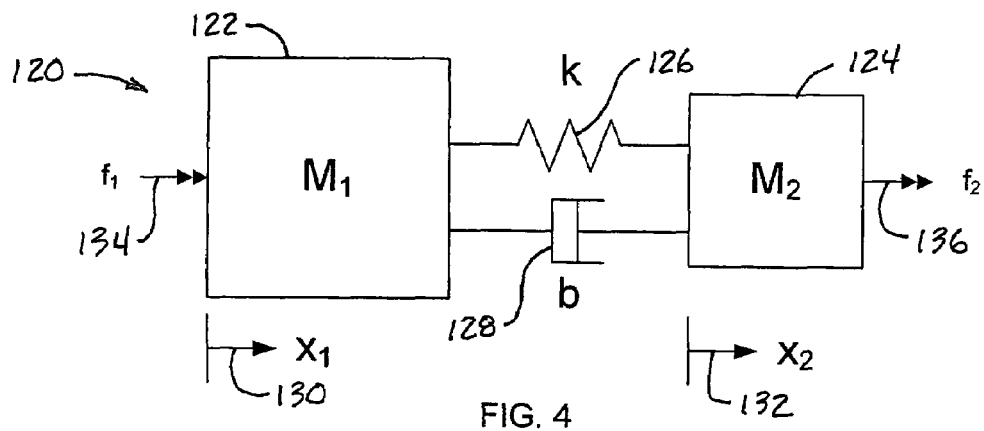
FIG. 4 is a simplified free body diagram of the servo track writer system.

Referring now to FIG. 4 of the drawing, depicted therein is a simplified free body diagram representing an analytical model 120 of the relevant STW dynamics in a typical STW system. In the diagram of FIG. 4, a block 122 ($M_1$) represents the inertia of the external VCM, and a block 124 ($M_2$) represents the inertia of the drive VCM. As indicated by the relative sizes of the blocks 122 and 124, the inertia of the external VCM is much larger than that of the drive VCM.

The model 120 further comprises a spring element 126 ($k$) and a damping element 128 ($b$) representing the resonance mode that appears when a pushpin and pushpin sleeve are used to connect the drive and external arm assemblies.

Positions 130 ($x_1$) and 132 ($x_2$) in FIG. 4 represent the positions of the external VCM and drive VCM, respectively. The positions 130 and 132 are defined such that, with both positions at zero, the spring element 126 is uncompressed. FIG. 4 further indicates that an external control torque 134 ($f_1$) and a drive control torque 136 ($f_2$) are available as servo control inputs to the system represented by the model 120.

The equations of motion for this system, in state space form, are shown in (1) and (2) below:

$$\begin{bmatrix} \dot{x}_1 \\ \ddot{x}_1 \\ \dot{x}_2 \\ \ddot{x}_2 \end{bmatrix} = \begin{bmatrix} 0 & 1 & 0 & 0 \\ -\frac{k}{M_1} & -\frac{b}{M_1} & \frac{k}{M_1} & \frac{b}{M_1} \\ 0 & 0 & 0 & 1 \\ \frac{k}{M_2} & \frac{b}{M_2} & -\frac{k}{M_2} & -\frac{b}{M_2} \end{bmatrix} \begin{bmatrix} x_1 \\ \dot{x}_1 \\ x_2 \\ \dot{x}_2 \end{bmatrix} + \begin{bmatrix} 0 & 0 \\ \frac{1}{M_1} & 0 \\ 0 & 0 \\ 0 & \frac{1}{M_2} \end{bmatrix} \begin{bmatrix} f_1 \\ f_2 \end{bmatrix} \quad (1)$$

$$\begin{bmatrix} x_1 \\ x_2 \end{bmatrix} = \begin{bmatrix} 1 & 0 & 0 & 0 \\ 0 & 0 & 1 & 0 \end{bmatrix} \begin{bmatrix} x_1 \\ \dot{x}_1 \\ x_2 \\ \dot{x}_2 \end{bmatrix}. \quad (2)$$

These equations assume that both positions, $x_1$ and $x_2$, can be sensed. While in reality the STW system cannot sense the drive VCM position, it is useful in this theoretical study to assume that the position of the drive VCM can be sensed. Taking the Laplace transform of the state space system and setting the initial conditions to zero, the following transfer function matrix representation in (3) and (4) results:

$$\begin{bmatrix} x_1(s) \\ x_2(s) \end{bmatrix} = \begin{bmatrix} H_{11}(s) & H_{12}(s) \\ H_{21}(s) & H_{22}(s) \end{bmatrix} \begin{bmatrix} f_1(s) \\ f_2(s) \end{bmatrix} \quad (3)$$

$$\begin{bmatrix} x_1(s) \\ x_2(s) \end{bmatrix} = \frac{\begin{bmatrix} M_2 s^2 + bs + k & bs + k \\ bs + k & M_1 s^2 + bs + k \end{bmatrix}}{s^2(M_1 M_2 s^2 + (M_1 + M_2)bs + (M_1 + M_2)k)} \begin{bmatrix} f_1(s) \\ f_2(s) \end{bmatrix}. \quad (4)$$

Traditional STW dynamics identification involved injecting a prescribed signal into the external VCM input, $f_1$, and measuring the external VCM position, $x_1$. From (3), this procedure identifies the transfer function $H_{11}(s)$. However, identifying $H_{11}(s)$ does not identify the mechanical resonance of interest. In proof of this statement, consider that the STW external VCM typically has an inertia that is approximately twenty times larger than that of the drive VCM for modern STW systems. Given the difference in inertia of the external and drive VCMs, it is useful to investigate the result of allowing the ratio $M_1/M_2$ to approach $\infty$ in (4). In the limit, the zeros of $H_{11}(s)$ $$\text{zeros}\{H_{11}(s)\} = \frac{-b \pm \sqrt{b^2 - 4M_2 k}}{2M_2} \quad (5)$$

cancel with two poles of $H_{11}(s)$ $$\text{poles}\{H_{11}(s)\} = \quad (6)$$

$$\frac{-(M_1 + M_2)b \pm \sqrt{(M_1 + M_2)^2 b^2 - 4M_1 M_2 (M_1 + M_2)k}}{2M_1 M_2} \approx$$

$$\frac{-b \pm \sqrt{b^2 - 4M_2 k}}{2M_2}$$

because $M_1 \approx M_2 + M_1$ as $M_1/M_2$ to approaches $\infty$. Thus, the mechanical resonance of interest does not show up in this transfer function. While the resonance mode disappears in $H_{11}(s)$ as $M_1$ increases, the mode is still preset in the other three transfer functions. Discounting transfer functions which output $x_2$, due to the unavailability of the measurement, the Applicant has recognized that the use of $H_{12}(s)$ to identify the resonance mode is a viable alternative to traditional methods of identifying STW dynamics.

The foregoing analysis of the analytical model represented in FIG. 4 has shown that the resonance mode cannot be effectively identified through traditional STW dynamics identification techniques relying on the identification of $H_{11}(s)$. However, this analysis has also shown that the resonance mode can be effectively identified by injecting a prescribed injection signal in the drive VCM and measuring the position of the external VCM (identification of $H_{12}(s)$).

II. Injection Signal

As mentioned above, the analytical model suggests that the injection of an injection signal into the drive VCM, and then measuring the position of the external VCM, can be used to identify the resonance mode of a STW system. The exact nature of the injection signal may depend upon the specifics of a particular STW system. In addition, different injection signals may be used to stimulate a particular STW system when implementing the principles of the present invention.

One example injection signal that may be used to determine the resonance mode of typical STW system is the sum of n sinusoids at specified frequencies $\omega_i$, with specified amplitude $A_i$, and random phase $\phi_i$:

$$u = \sum_{i=1}^{n} A_i \sin(\omega_i + \phi_i). \quad (7)$$

Figure 5:
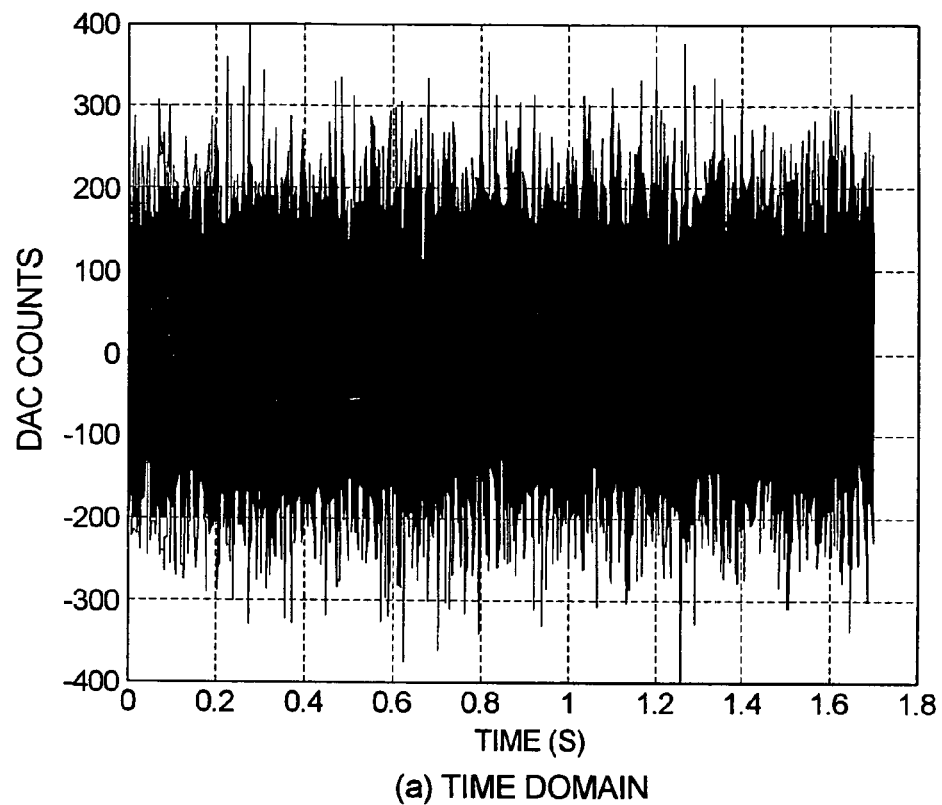
FIG. 5 contains time domain and frequency domain plots illustrating an injection signal that may be used by a system or method implementing the principles of the present invention.
Figure 5:
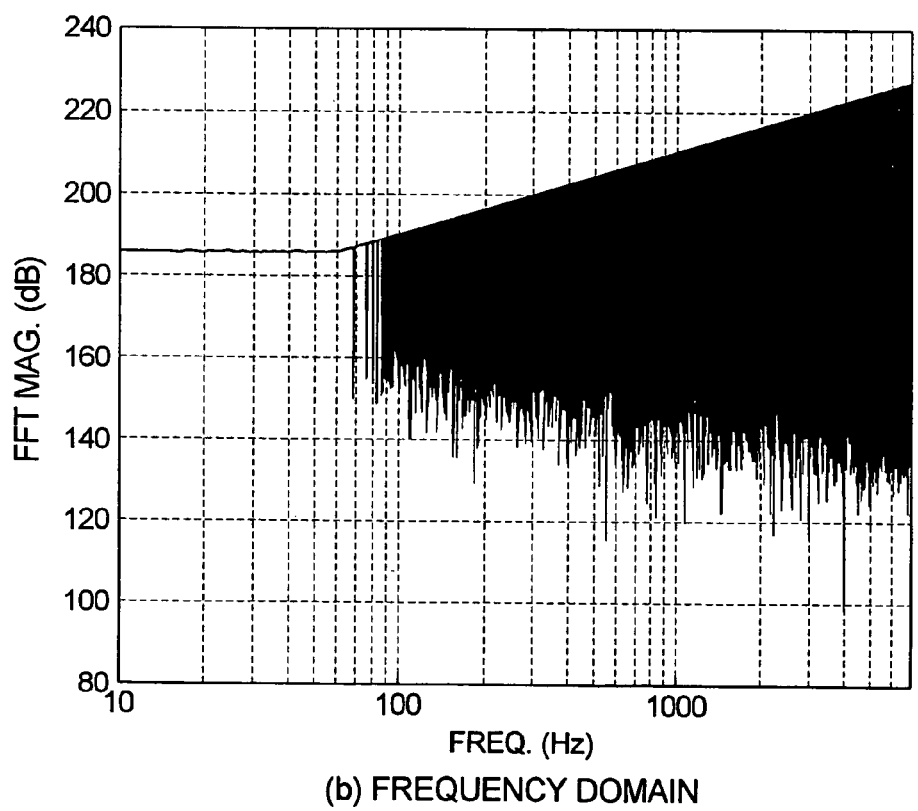

The frequencies that make up u are selected from the set of exact Discrete Fourier Transform (DFT) frequencies. This ensures that each sinusoid has an integer number of periods in the injection signal and keeps DFT leakage effects from corrupting the spectrum of u. The example prescribed injection signal described herein is made up of 1000 sinusoids, with the frequencies spanning 1 Hz to 7 kHz. The sinusoidal amplitudes, $A_i$, are selected based on observing the signal-to-noise ratio in the measured output. If there is little output energy at a frequency $\omega_i$, relative to the noise floor, the amplitude $A_i$ can be increased in an attempt to increase the output energy at that frequency. FIG. 5 shows an example of an injection signal as described herein.

III. Least Squares Model Fitting

After applying the injection signal, u, to the servo control loop and simultaneously collecting a measured plant output vector y, numerous options exist for measuring the plant transfer function. The Empirical Transfer Function Estimate (ETFE) can be formed by dividing the DFT of the output with the DFT of the input at the $\omega_i$ frequencies. While the ETFE can give accurate frequency domain description of the dynamics, it does not provide parametric model information such as resonance mode frequency and damping ratio. One option to estimate these parameters is to fit a parametric model to the input-output data. The next two sub-sections present methods for fitting parametric models in both frequency and time domains.

A. Time Domain Example

A generic discrete time transfer function is $$G(z^{-1}) = \frac{y(z^{-1})}{u(z^{-1})} = z^{-d} \frac{b_0 + b_1 z^{-1} + \ldots + b_M z^{-M}}{1 + a_1 z^{-1} + \ldots + a_N z^{-N}}, \quad (8)$$

Where d is the delay order, M is the numerator order, and N is the denominator order. The resulting difference equation, after solving for $y_k$, is $$y_k = -a_1 y_{k-1} - \ldots - a_N y_{k-N} + b_0 u_{k-d} + b_1 u_{k-d-1} + \ldots + b_M u_{k-d-M} \quad (9)$$

Given the data sequences $y_k$ and $u_k$ from the injection signal, this difference equation can be formed into the following linear matrix equation:

$$\begin{bmatrix} \vdots \\ y_k \\ y_{k+1} \\ \vdots \\ y_L \end{bmatrix} = \begin{bmatrix} \vdots & \vdots & \vdots & \vdots & \vdots & \vdots & \vdots & \vdots \\ -y_{k-1} & -y_{k-2} & \cdots & -y_{k-N} & u_{k-d} & u_{k-d-1} & \cdots & u_{k-d-M} \\ -y_k & -y_{k-1} & \cdots & -y_{k-N+1} & u_{k-d+1} & u_{k-d} & \cdots & u_{k-d-M+1} \\ \vdots & \vdots & \vdots & \vdots & \vdots & \vdots & \vdots & \vdots \\ -y_{L-1} & -y_{L-2} & \cdots & -y_{L-N} & u_{L-d} & u_{L-d-1} & \cdots & u_{L-d-M} \end{bmatrix} \begin{bmatrix} a_1 \\ a_2 \\ \vdots \\ a_N \\ b_0 \\ b_1 \\ \vdots \\ b_M \end{bmatrix} \quad (10)$$

$$Y_{(L-M-d-1)\times 1} = A_{(L-M-d-1)\times(1+M+N)} X_{(1+M+N)\times 1} \quad (11)$$

where L is the length of the data vectors. Assuming the rank of the A matrix is M+N+1, this over-constrained set of equations can be solved using a least squares pseudo-inverse. The transfer function parameters are then specified by $$X = (A^T A)^{-1} A^T Y. \quad (12)$$

B. Frequency Domain Example

Again starting with the transfer function mode in (8), the frequency response at a given frequency $\omega_o$ can be written as:

$$\begin{aligned} G(e^{-j\omega_o T}) = & -a_1 e^{-j\omega_o T} G(e^{-j\omega_o T}) - a_2 e^{-2j\omega_o T} \\ & G(e^{-j\omega_o T}) - \ldots - a_N e^{-Nj\omega_o T} G(e^{-j\omega_o T}) + b_0 e^{-dj\omega_o T} + \\ & b_1 e^{-(d+1)j\omega_o T} + \ldots + b_M e^{-(d+M)j\omega_o T}, \end{aligned} \quad (13)$$

where j is the square root of −1 and T is the sample time. Given the frequency response at multiple frequencies, the equations can be stacked into a linear matrix equation. In order to ensure the resulting parameter vector is real, the matrix equation is augmented with its complex conjugate:

$$\begin{bmatrix} G(e^{-j\omega_0 T}) \\ G(e^{-j\omega_1 T}) \\ \vdots \\ G(e^{-j\omega_p T}) \\ G(e^{j\omega_0 T}) \\ \vdots \\ G(e^{j\omega_p T}) \end{bmatrix} = \begin{bmatrix} -e^{-j\omega_0 T} G(e^{-j\omega_0 T}) & \cdots & -e^{-Nj\omega_0 T} G(e^{-j\omega_0 T}) & e^{-dj\omega_0 T} & \cdots & e^{-(d+M)j\omega_0 T} \\ -e^{-j\omega_1 T} G(e^{-j\omega_1 T}) & \cdots & -e^{-Nj\omega_1 T} G(e^{-j\omega_1 T}) & e^{-dj\omega_1 T} & \cdots & e^{-(d+M)j\omega_1 T} \\ \vdots & \vdots & \vdots & \vdots & \vdots & \vdots \\ -e^{-j\omega_p T} G(e^{-j\omega_p T}) & \cdots & -e^{-Nj\omega_p T} G(e^{-j\omega_p T}) & e^{-dj\omega_p T} & \cdots & e^{-(d+M)j\omega_p T} \\ -e^{j\omega_0 T} G(e^{j\omega_0 T}) & \cdots & -e^{Nj\omega_0 T} G(e^{j\omega_0 T}) & e^{dj\omega_0 T} & \cdots & e^{(d+M)j\omega_0 T} \\ \vdots & \vdots & \vdots & \vdots & \vdots & \vdots \\ -e^{j\omega_p T} G(e^{j\omega_p T}) & \cdots & -e^{Nj\omega_p T} G(e^{j\omega_p T}) & e^{dj\omega_p T} & \cdots & e^{(d+M)j\omega_p T} \end{bmatrix} \begin{bmatrix} a_1 \\ a_2 \\ \vdots \\ a_N \\ b_0 \\ b_1 \\ \vdots \\ b_M \end{bmatrix} \quad (14)$$

$$Y_{2P\times 1} = A_{2P\times(1+M+N)} X_{(1+M+N)\times 1}, \quad (15)$$

where P is the number of frequencies at which the transfer function has been evaluated. Similar to the time domain case, this is an over-constrained set of equations that can be solved with the pseudo-inverse of A, assuming that A is rank 1+M+N.

IV. Experimental Results

Figure 6:
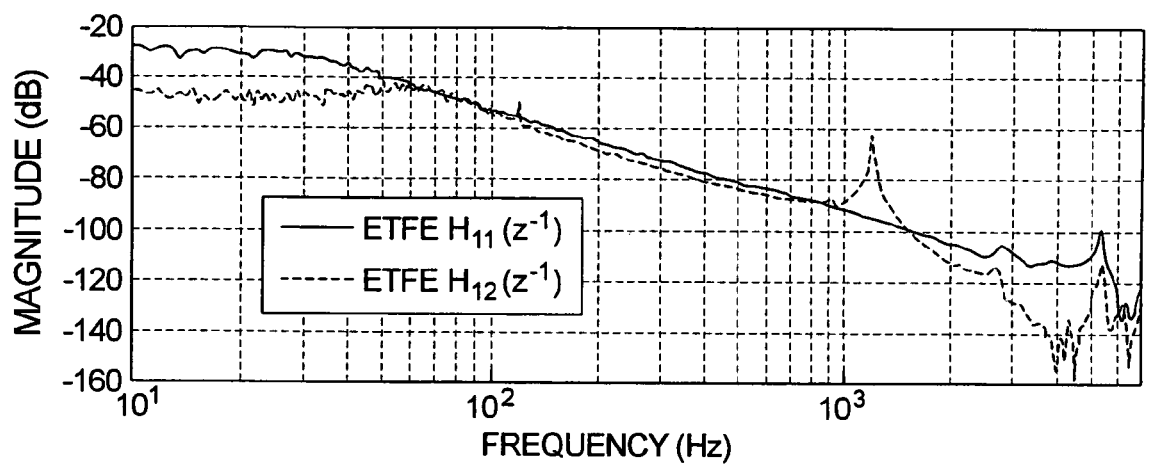
FIG. 6 contains plots of magnitude and phase against frequency of Empirical Transfer Function Estimates (EFTEs) of transfer functions obtain by applying the injection signal depicted in FIG. 7 to the servo track writer VCM and to the hard disk drive VCM.
Figure 6:
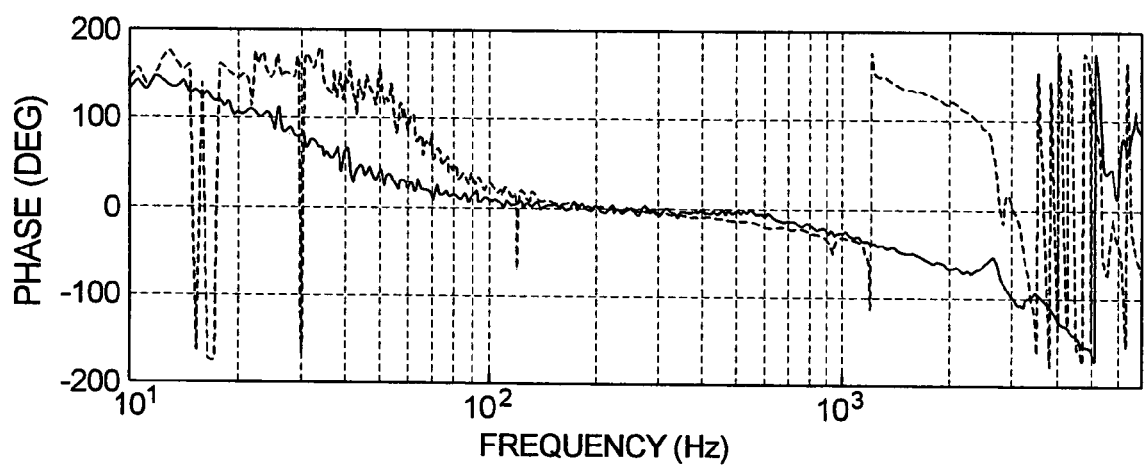

FIG. 6 compares the EFTEs of the transfer functions $H_{11}(z^{-1})$ and $H_{12}(z^{-1})$. This data was collected by first applying the injection signal to the external VCM and then applying the same signal to the drive VCM. While there are common low and high frequency modes in the data sets, the dominant resonance mode near 1 kHz is only present in $H_{12}(z^{-1})$. The data represented in FIG. 6 provides experimental validation of the theoretical results described above.

Figure 7:
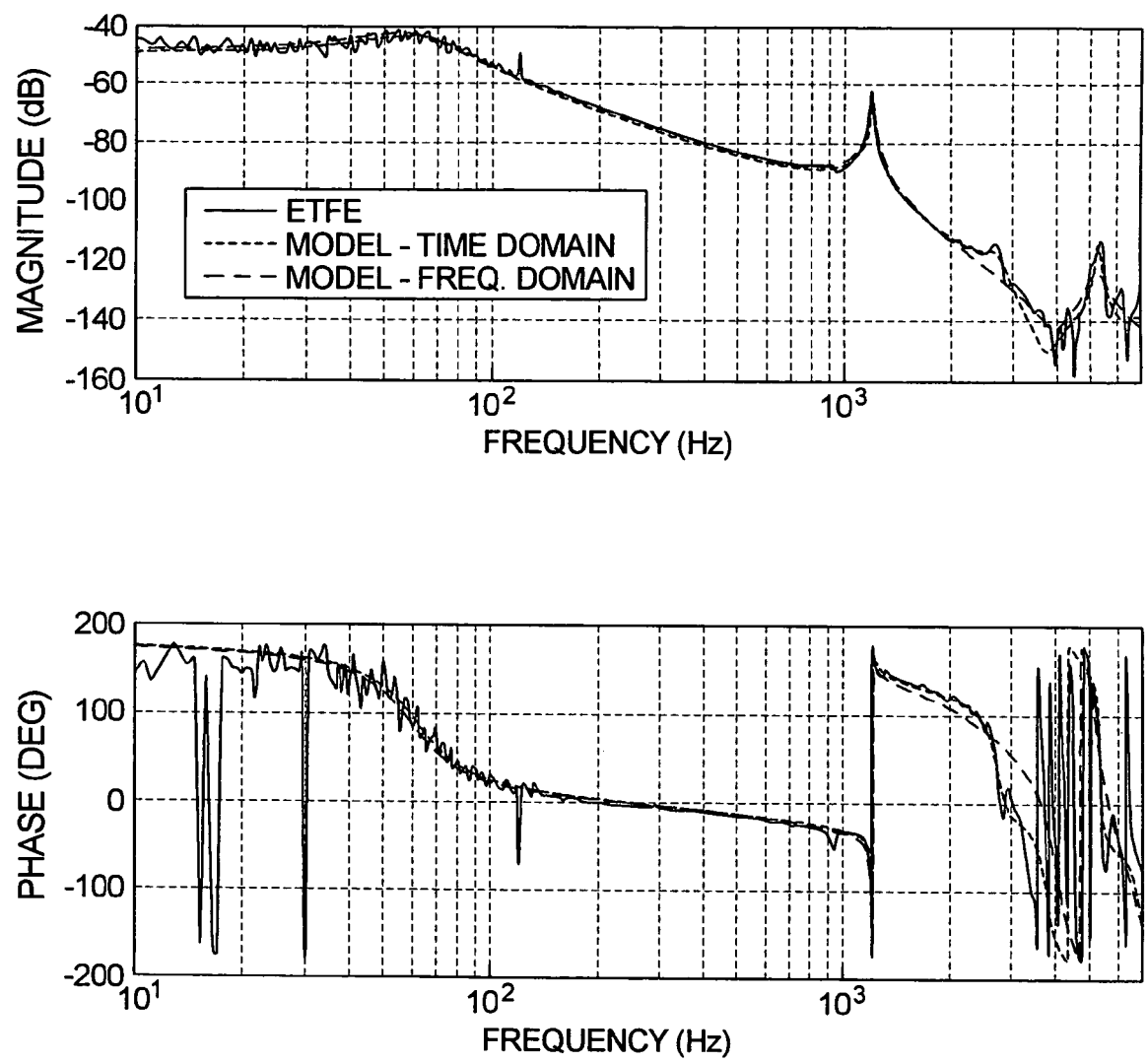
FIG. 7 compares the resonance mode parameters for the time and frequency domain least squares fits.
Figure 8:
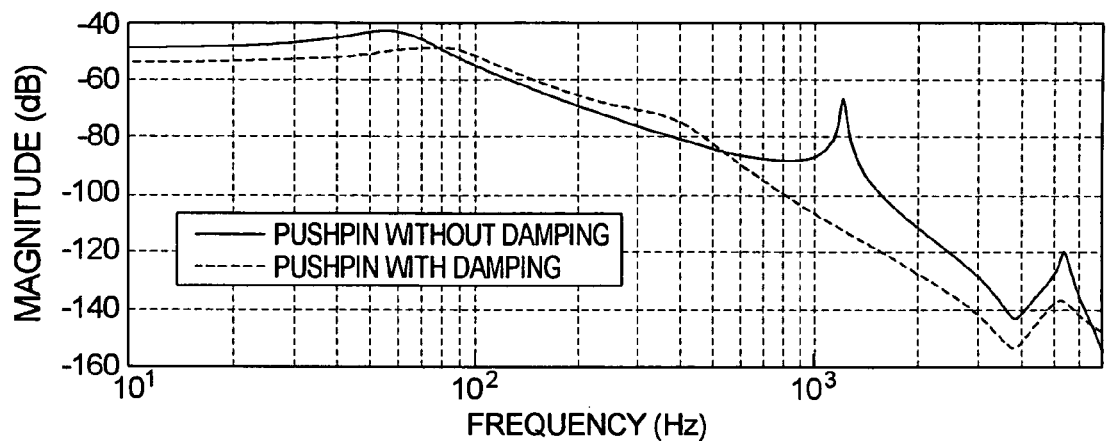
FIG. 8 compares the resonance mode parameters for two different pushpin designs.
Figure 8:
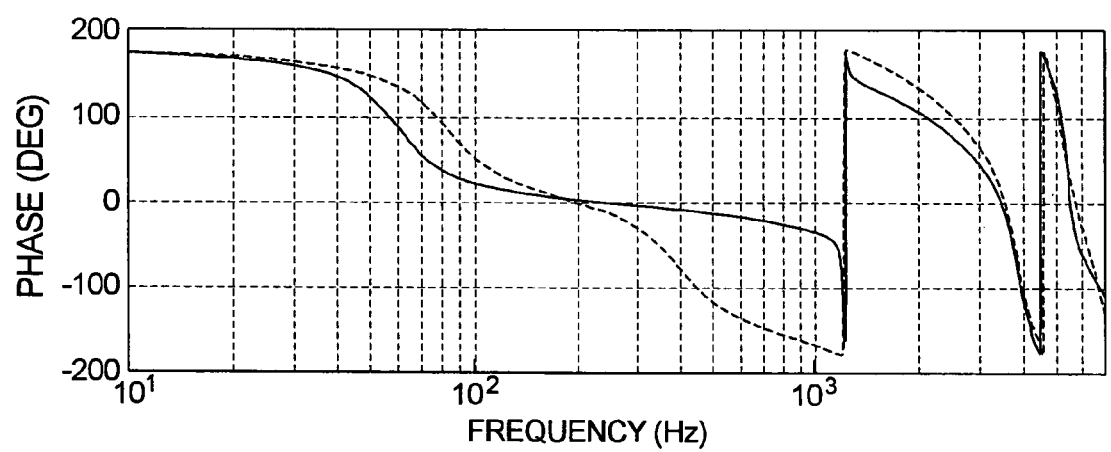

FIG. 7 plots the time and frequency domain fits to the input-output data. The two least squares methods provide very similar results, making it difficult to identify the individual traces in this plot. The following Table I below shows a comparison between the identified resonance mode parameters, natural frequency $\omega_i$ and damping ratio $\zeta$, for the two different parametric models. The results in Table I are virtually identical.

TABLE I

COMPARISON OF RESONANCE MODE PARAMETERS FOR THE TIME AND FREQUENCY LEAST SQUARES FITS

|  | $\omega_n$ [Hz] | $\zeta$ |
|---|---|---|
| Time Domain Fit | 1200.33 | 0.0074 |
| Frequency Domain Fit | 1199.94 | 0.0092 |

FIG. 5 uses the least squares fitting technique to parameterize two different pushpins which have very different resonance characteristics. Table II shows that the heavily damped resonance differs in damping ratio by greater than an order of magnitude and also occurs at a much lower frequency.

TABLE II

COMPARISON OF RESONANCE MODE PARAMETERS FOR TWO DIFFERENT PUSHPIN DESIGNS

|  | $\omega_n$ [Hz] | $\zeta$ |
|---|---|---|
| Lightly Damped Mode | 1200.81 | 0.0130 |
| Heavily Damped Mode | 404.77 | 0.2475 |

Over time, the damping sleeve of a pushpin of a typical STW system may lose its damping properties. A servo compensator designed for the highly damped dynamics may have undesirable performance when applied to the less damped system. As will be described in further detail below, the methods of this invention allow the STW system to characterize this resonance on-line in a production environment and determine whether differences in dynamics, such as those depicted in FIG. 5, exist.

The present invention thus may be implemented as a method of parameterizing the dominant STW resonance when the pushpin is in contact with the drive actuator. The present invention may also be embodied as a system for generating resonance mode information that may be used in a number of ways directly and indirectly to improve STW performance. Specifically, the identification of $H_{12}(z^{-1})$ is shown, both theoretically and experimentally, to be superior to the identification of $H_{11}(z^{-1})$ when concerned with observing this resonance. With the resonance observable in the input-output data, methods such as the time or frequency domain methods can be used to compute the natural frequency and damping of the mode. These values form natural pass-fail criteria for the STW in a production environment and can help prevent STWs from writing drives with an oscillation in the position of the servo pattern.

V. Example STW Systems

Figure 9:
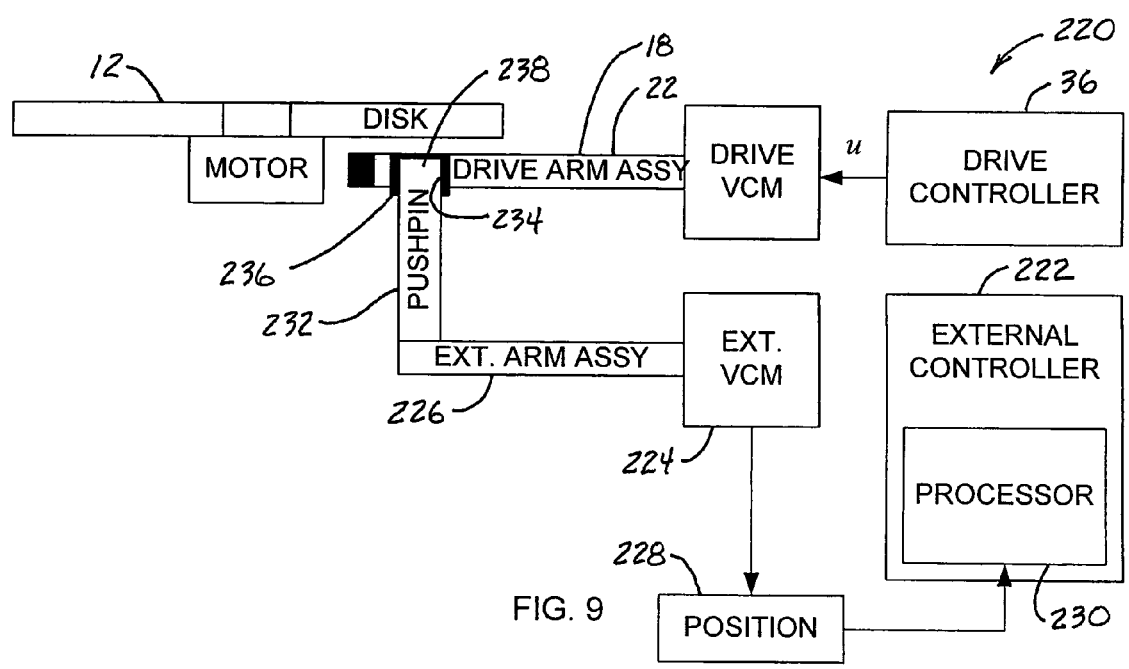
FIG. 9 is a simplified block diagram of a system for generating resonance mode information associated with the pushpin resonance mode of a servo track writer servo system using the principles of the present invention.

Referring now to FIG. 9 of the drawing, depicted at 220 therein is a first example STW system constructed in accordance with, and embodying, the principles of the present invention. Like the STW system 60 described above, the system 220 may be operated in a servo track writer mode to write servo track information onto the HDD system 10 immediately after initial manufacture of the system 10. However, as depicted in FIG. 9, the example STW system 220 further operates in a diagnostic mode in which the system 220 generates resonance mode information.

The example servo track writer (STW) system 220 comprises, in addition to components the HDD system 10, an external controller 222, an external VCM 224, an external arm assembly 226, and a position sensor 228. The position sensor 228 is connected to a processor 230. The example processor 230 is formed by the external controller 222. To form the STW system 220, the disk 12 is mounted in a predetermined spatial relationship with the external VCM 224 and external arm assembly 226. The external arm assembly 226 is then mechanically coupled to the drive arm assembly 18.

The mechanical connection between the drive arm assembly 18 and the external arm assembly 226 is formed by a pushpin 232 that extends from the external arm assembly 226 and a pushpin hole 234 formed in the flexure arm 22 of the drive arm assembly 18. Typically, a pushpin sleeve 236 extends at least partly around an engaging end 238 of the pushpin 70.

As described above, with the pushpin 232 in engagement with the drive arm assembly 18, a dominant mechanical pushpin resonance of the system formed by the HDD system 10 and the STW system 60 may appear that is not present in the external VCM dynamics alone. To generate resonance mode information, the drive controller 36 applies an injection signal u into the drive VCM. At this point, the input to the external VCM is zero. The position sensor 228 generates a position signal that is indicative of the position of the external arm assembly 226 and external VCM 224 and thus represents an output of the STW system 60 in the diagnostic mode. Based on the injection signal and the output signal, resonance mode information can be generated as generally described above.

The calculation of resonance mode information based on the injection signal and the output signal can be implemented by a processor such as the processor 230 forming part of the external controller 222 or by an algorithm running on a dedicated processor or some other processing system not part of the external controller 222.

Once the STW system 220 operating in the diagnostic mode has generated the resonance mode information, this information can be used in a number of ways. As one example, the resonance mode information generated by the system 220 can be used to evaluate pushpin and pushpin sleeve materials, pushpin and pushpin sleeve mechanical designs, and combinations thereof.

Another use of this information is to determine whether the STW system 220 is operating within certain predefined parameters and, if not, components of this system such as the pushpin and/or pushpin sleeve can be replaced. The use of the resonance mode information to evaluate the performance of a particular STW system 220 is very important. Pushpin wear is one of the dominant causes of subtle but significant STW quality control issues. At the factory, several days typically pass before drives are fully processed and can be tested for subtle quality control issues related to pushpin wear. The use of the principles of the present invention in a test system for verifying that a particular STW system is operating with certain predetermined parameters prior to the use of that particular STW system to process a batch of drives is likely to result in significantly improved yields.

Figure 10:
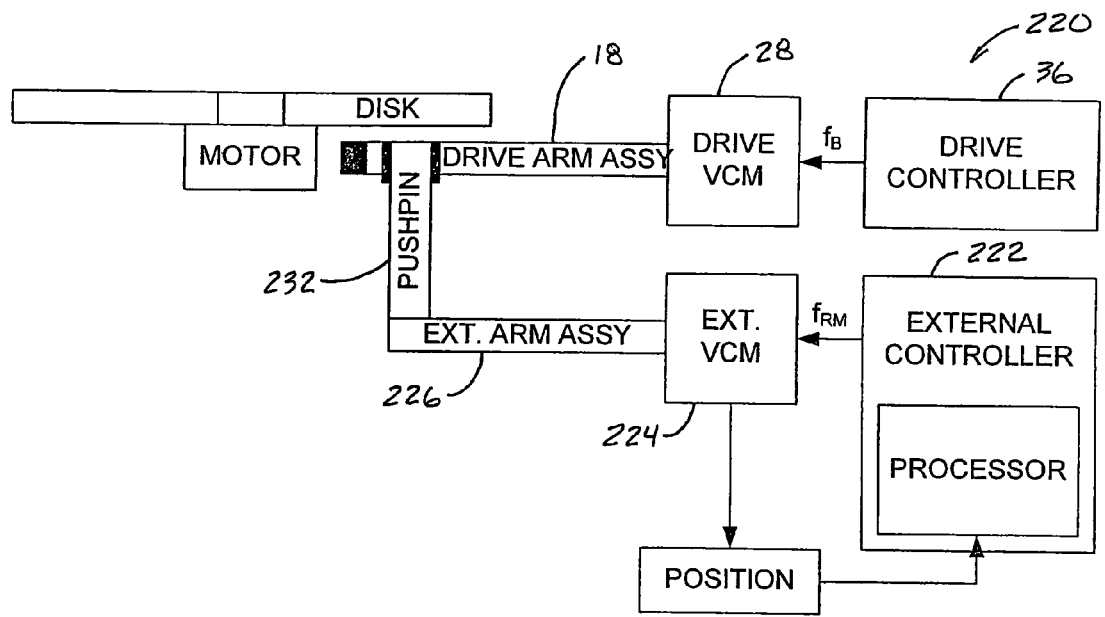
FIG. 10 is a simplified block diagram of a servo track writer system that uses resonance mode information to control both the hard disk drive VCM and the servo track writer VCM of a servo track writer system.

Yet another use of the resonance mode information is to alter the servo compensator embodied in one or both of the drive controller 36 and the external controller 222. One example of the use of the resonance mode information to adapt a servo compensator is depicted in FIG. 10. In FIG. 10, the example STW system 220 is depicted operating in a first example compensated servo track writer mode in which parameters of the servo compensator of the external controller 222 have been modified with the resonance mode information generated while the STW system 220 operated in the diagnostic mode. In this case, the drive controller 36 generates a signal $f_B$ that causes the drive VCM 28 to bias the drive arm assembly 18 against the pushpin 232. The external controller 222 generates a signal $f_{RM}$ that causes the external VCM 224 to move the external arm assembly 226 such that the dominant resonance mode is actively damped or otherwise reduced or eliminated.

Figure 11:
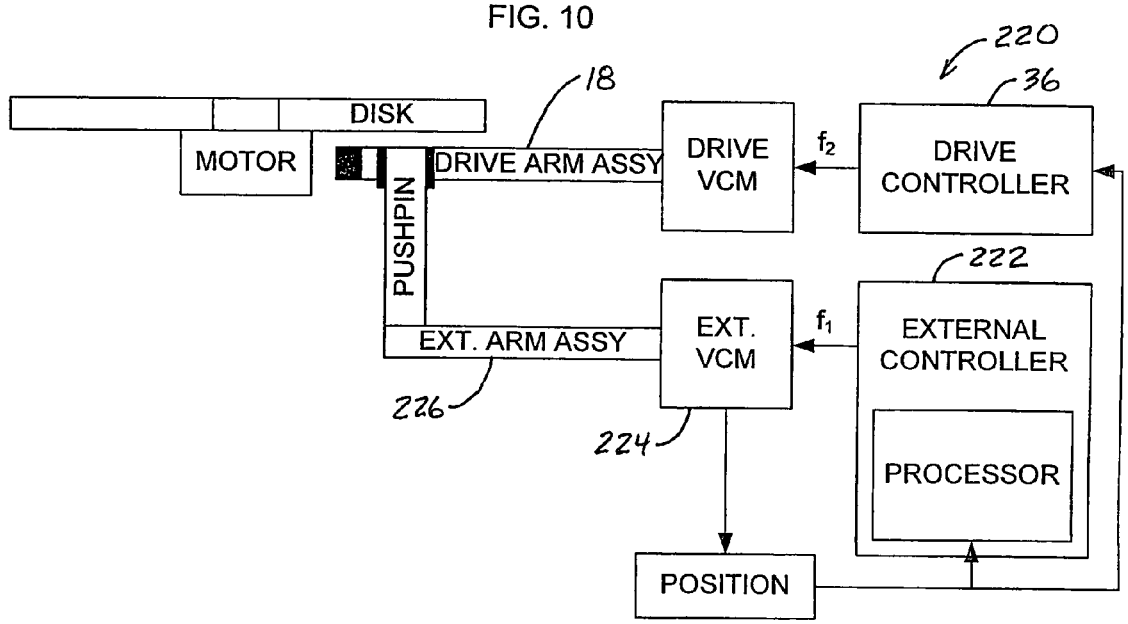
FIG. 11 is a simplified block diagram of a servo track writer system that uses resonance mode information to control the servo track writer VCM of a servo track writer system.

Another example of the resonance mode information to adapt a servo compensator is depicted in FIG. 10. In FIG. 10, the example STW system 220 is depicted operating in a second example compensated servo track writer mode in which parameters of the servo compensators of both the drive controller 36 and the external controller 222 have been modified with the resonance mode information generated while the STW system 220 operated in the diagnostic mode. In FIG. 11, the external controller 222 generates a first signal $f_1$ that causes the external VCM 224 to move the external arm assembly 226. In addition, the drive controller 36 generates a second signal $f_2$ that causes the external VCM 224 to move the external arm assembly 226. The parameters of the servo compensators embodied in the external controller 222 and the drive controller 36 are selected such that the dominant resonance mode is actively damped or otherwise reduced or eliminated.

The servo compensators of the drive controller 36 and/or the external controller 222 may be modified using resonance mode information as described above with reference to FIGS. 10 and 11 under any one or more of a number of conditions.

As one example, one or both of the drive or external controllers may be adapted upon initial design of the STW system 220. As another example, one or both of the controllers may be adapted using new resonance mode information whenever a new pushpin and/or pushpin sleeve is used. As yet another example, one or both of the controllers may be adapted using resonance mode information generated according to a predetermined schedule or upon the occurrence of an event such as initializing the STW system or the formatting of a new HDD system. In addition, one or both controllers may be adapted based on resonance mode information obtained in real time during operation of the STW system.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

We claim:

1. A system for generating resonance mode information associated with a servo track writer system comprising a drive VCM, a drive arm assembly, an external VCM, an external arm assembly, and a mechanical connection between the external arm assembly and the drive arm assembly, comprising:
    a controller adapted to apply an injection signal to the drive VCM such that the injection signal causes movement of the external arm assembly through the drive arm assembly and the pushpin;
    a position sensor configured to generate an output signal indicative of a position of the external arm assembly; and
    a processor that generates the resonance mode information based on the injection signal and the output signal.

2. A system as recited in claim 1, in which the injection signal comprises two or more sinusoids.

3. A system as recited in claim 2, in which an amplitude of a given one of the sinusoids is increased based on energy of the output signal at a frequency of the given one of the sinusoids.

4. A system as recited in claim 1, in which the injection signal comprises two or more sinusoids, where the frequencies of the sinusoids are selected from a set of exact DFT frequencies.

5. A system as recited in claim 1, in which the injection signal comprises two or more sinusoids, where the frequencies of the sinusoids are selected to minimize leakage effects on the spectrum of the injection signal.

6. A system as recited in claim 1, in which an amplitude of the injection signal is selected based on a signal-to-noise ratio of the output signal.

7. A system as recited in claim 1, in which the processor generates the resonance mode information by dividing the discrete fourier transform of the output signal with the discrete fourier transform of the injection signal.

8. A system as recited in claim 1, in which the processor generates the resonance mode information using model fitting.

9. A system as recited in claim 1, in which the mechanical assembly is formed by a pushpin and a pushpin sleeve.

10. A method for generating resonance mode information associated with a servo track writer system comprising a drive VCM, a drive arm assembly, and an external arm assembly, an external VCM, and a pushpin mechanically connecting the external arm assembly and the drive arm assembly, the method comprising the steps of:
    applying an injection signal to the drive VCM such that the injection signal causes movement of the external arm assembly through the drive arm assembly and the pushpin;
    generating an output signal indicative of a position of the external arm assembly; and
    generating the resonance mode information based on the injection signal and the output signal.

11. A method as recited in claim 10, further comprising the step of selecting at least one of a pushpin material, mechanical pushpin design, pushpin sleeve material, and mechanical pushpin sleeve design based on the resonance mode information.

12. A method as recited in claim 10, further comprising the step of determining whether at least one of a pushpin and pushpin sleeve are outside of predetermined parameters based on the resonance mode information.

13. A method as recited in claim 10, further comprising the step of modifying at least one of a drive controller and an external controller based on the resonance mode information.

14. A method as recited in claim 13, further comprising the step of modifying at least one of the drive controller and the external controller upon the occurrence of a predetermined event.

15. A method as recited in claim 13, further comprising the step of periodically modifying at least one of the drive controller and the external controller.

16. A method as recited in claim 13, further comprising the step of modifying at least one of the drive controller and the external controller in real time.

17. A method as recited in claim 10, in which the step of applying the injection signal to the drive VCM comprises the step of providing two or more sinusoids.

18. A method as recited in claim 17, in which the step of applying the injection signal to the drive VCM comprises the step of selecting frequencies of the sinusoids to minimize leakage effects on the spectrum of the injection signal.

19. A method as recited in claim 10, in which the step of applying the injection signal to the drive VCM comprises the step of selecting an amplitude of the injection signal based on a signal-to-noise ratio of the output signal.

20. A method as recited in claim 10, in which the step of generating the resonance mode information comprises the step of dividing the discrete fourier transform of the output signal with the discrete fourier transform of the injection signal.

21. A method as recited in claim 10, in which the step of generating the resonance mode information comprises the step of using model fitting.

22. A servo track writer system comprising:
    a drive VCM;
    a drive arm assembly;
    an external VCM;
    an external arm assembly;
    a pushpin mechanically connecting the external arm assembly and the drive arm assembly;
    a drive controller adapted to apply an injection signal to the drive VCM such that the injection signal causes movement of the external arm assembly through the drive arm assembly and the pushpin;
    a position sensor configured to generate an output signal indicative of a position of the external arm assembly; and
    a processor that generates the resonance mode information based on the injection signal and the output signal.

23. A system as recited in claim 22, in which the injection signal comprises two or more sinusoids, where the frequencies of the sinusoids are selected from a set of exact DFT frequencies.

24. A system as recited in claim 22, in which the injection signal comprises two or more sinusoids, where the frequencies of the sinusoids are selected to minimize leakage effects on the spectrum of the injection signal.

25. A system as recited in claim 22, in which an amplitude of the injection signal is selected based on a signal-to-noise ratio of the output signal.

26. A system as recited in claim 22, in which an amplitude of a given one of the sinusoids is increased based on energy of the output signal at a frequency of the given one of the sinusoids.

27. A system as recited in claim 22, in which the processor generates the resonance mode information by dividing the discrete fourier transform of the output signal with the discrete fourier transform of the injection signal.

28. A system as recited in claim 22, in which the processor generates the resonance mode information using model fitting.

29. A system as recited in claim 22, further comprising a pushpin sleeve arranged between the pushpin and the drive arm assembly.

30. A method of writing servo information to a disk comprising the steps of:
   operatively connecting a drive VCM to a drive arm assembly;
   operatively connecting an external VCM to an external arm assembly;
   mechanically connecting the external arm assembly and the drive arm assembly;
   applying an injection signal to the drive VCM such that the injection signal causes movement of the external arm assembly;
   generating an output signal indicative of a position of the external arm assembly; and
   operating in a diagnostic mode to generate resonance mode information based on the injection signal and the output signal; and
   operating in a servo track writer mode to write servo data to the disk, where at least one of a drive controller and an external controller is adapted based on the resonance mode information.

31. A method as recited in claim 30, further comprising the step of selecting at least one of a pushpin material, mechanical pushpin design, pushpin sleeve material, and mechanical pushpin sleeve design based on the resonance mode information.

32. A method as recited in claim 30, in which the step of mechanically connecting the external arm assembly to the internal arm assembly comprises the step of providing a pushpin and a pushpin sleeve, the method further comprising the step of determining whether at least one of a pushpin and pushpin sleeve are outside of predetermined parameters based on the resonance mode information.

33. A method as recited in claim 30, further comprising the step of adapting at least one of the drive controller and the external controller upon the occurrence of a predetermined event.

34. A method as recited in claim 30, further comprising the step of periodically adapting at least one of the drive controller and the external controller.

35. A method as recited in claim 30, further comprising the step of adapting at least one of the drive controller and the external controller in real time.

36. A method as recited in claim 30, in which the step of applying the injection signal to the drive VCM comprises the step of providing two or more sinusoids.

37. A method as recited in claim 36, in which the step of applying the injection signal to the drive VCM comprises the step of selecting frequencies of the sinusoids to minimize leakage effects on the spectrum of the injection signal.

38. A method as recited in claim 30, in which the step of applying the injection signal to the drive VCM comprises the step of selecting an amplitude of the injection signal based on a signal-to-noise ratio of the output signal.

39. A method as recited in claim 30, in which the step of generating the resonance mode information comprises the step of dividing the discrete fourier transform of the output signal with the discrete fourier transform of the injection signal.

40. A method as recited in claim 30, in which the step of generating the resonance mode information comprises the step of using model fitting.

41. A servo track writer system comprising:
   a disk;
   a drive controller;
   a drive VCM;
   a drive arm assembly;
   an external controller;
   an external VCM;
   an external arm assembly;
   a pushpin mechanically connecting the external arm assembly and the drive arm assembly;
   a drive controller adapted to apply an injection signal to the drive VCM such that the injection signal causes movement of the external arm assembly through the drive arm assembly and the pushpin;
   a position sensor configured to generate an output signal indicative of a position of the external arm assembly; and
   a processor; wherein
   the servo track writer system operates in a servo track writer mode in which servo track information is written to the disk; and
   the servo track writer system operates in a diagnostic mode in which the processor generates the resonance mode information based on the injection signal and the output signal.

42. A system as recited in claim 41, in which the injection signal comprises two or more sinusoids.

43. A system as recited in claim 42, in which frequencies of the sinusoids are selected from a set of exact DFT frequencies.

44. A system as recited in claim 42, in which frequencies of the sinusoids are selected to minimize leakage effects on the spectrum of the injection signal.

45. A system as recited in claim 41, in which an amplitude of the injection signal is selected based on a signal-to-noise ratio of the output signal.

46. A system as recited in claim 41, in which an amplitude of a given one of the sinusoids is increased based on energy of the output signal at a frequency of the given one of the sinusoids.

47. A system as recited in claim 41, in which the processor generates the resonance mode information by dividing the discrete fourier transform of the output signal with the discrete fourier transform of the injection signal.

48. A system as recited in claim 41, in which the processor generates the resonance mode information using model fitting.

49. A system as recited in claim 41, further comprising a pushpin sleeve arranged between the pushpin and the drive arm assembly.

* * * * *